(12) United States Patent
Kawabata

(10) Patent No.: US 8,574,679 B2
(45) Date of Patent: Nov. 5, 2013

(54) SUBSTRATE STRUCTURE AND MANUFACTURING METHOD OF THE SAME

(75) Inventor: Akio Kawabata, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1131 days.

(21) Appl. No.: 12/040,044

(22) Filed: Feb. 29, 2008

(65) Prior Publication Data

US 2008/0241493 A1 Oct. 2, 2008

(30) Foreign Application Priority Data

Mar. 29, 2007 (JP) .................................. 2007-089202

(51) Int. Cl.
*B32B 7/02* (2006.01)

(52) U.S. Cl.
USPC ........................................................ 427/301

(58) Field of Classification Search
USPC .............................. 427/301, 201–205; 977/700
See application file for complete search history.

(56) References Cited

U.S. PATENT DOCUMENTS

| | | | |
|---|---|---|---|
| 6,764,874 B1 * | 7/2004 | Zhang et al. | 438/99 |
| 7,018,944 B1 * | 3/2006 | Carnahan | 438/736 |
| 8,148,820 B2 | 4/2012 | Sato | |
| 2006/0045836 A1 | 3/2006 | Sato | |
| 2006/0290003 A1 * | 12/2006 | Kawabata et al. | 257/774 |

FOREIGN PATENT DOCUMENTS

| | | |
|---|---|---|
| JP | 2005-145743 A | 6/2005 |
| JP | 2005-263564 A | 9/2005 |
| JP | 2006-27949 A | 2/2006 |
| JP | 2006-69817 A | 3/2006 |
| JP | 2006-255817 A | 9/2006 |

OTHER PUBLICATIONS

Japanese Office Action dated Aug. 21, 2012, issued in corresponding Japanese Patent Application No. 2007-089202, (2 pages).

* cited by examiner

*Primary Examiner* — Timothy Meeks
*Assistant Examiner* — Nathan T Leong
(74) *Attorney, Agent, or Firm* — Westerman, Hattori, Daniels & Adrian, LLP

(57) ABSTRACT

With TiN being a base material, TiN fine particles are deposited on a silicone substrate by, for example, a laser ablation method so that diameters of the TiN fine particles are about 3 nm, and thereafter, Co fine particles are deposited on the silicon substrate on which the TiN fine particles are deposited, by, for example, the laser ablation method so that sizes of the Co fine particles are equal to or smaller than sizes of the fine particles of the TiN fine particles, here about 1 nm in diameter.

8 Claims, 7 Drawing Sheets

US 8,574,679 B2

SUBSTRATE STRUCTURE AND MANUFACTURING METHOD OF THE SAME

CROSS-REFERENCE TO RELATED APPLICATIONS

This application is based upon and claims the benefit of priority from the prior Japanese Patent Application No. 2007-089202, filed on Mar. 29, 2007, the entire contents of which are incorporated herein by reference.

BACKGROUND OF THE INVENTION

1. Field of the Invention

The present invention relates to a substrate structure using a so-called carbon nano tube (CNT), a carbon nano fiber (CNF) or the like being a linear structure made of carbon elements and a manufacturing method of the same.

2. Description of the Related Art

A CNT and a CNF which are linear structures of carbon-based self-organizing materials, in particular the CNT, attract attention because of their many appealing physical properties.

Because of a superior property of having a low electric resistance and a high mechanical intensity, the CNT is expected to be applied to a wide range of fields such as a semiconductor device represented by an LSI, a variety of sensors such as an acceleration sensor, an electronic device, and a heat-radiating device.

[Patent Document 1] Japanese Patent Application Laid-open No. 2005-145743

[Patent Document 2] Japanese Patent Application Laid-open No. 2006-255817

In order to grow the CNTs in high density and without unevenness, it is necessary that catalytic metals to be nucleuses (staring points) of CNT growth exist in high density and independently. Thus, a technology is developed to deposit the catalytic metals in a form of fine particles on a base thin film. However, if catalytic fine particles are deposited in such a manner, aggregation of the catalytic particles occurs when a growth temperature of the CNT is reached. A concrete example is shown in FIGS. 7A and 7B. In this case, aggregates 103 of the catalytic particles of various sizes randomly exist on a base thin film 102 on a silicone substrate 101 and initial fine particle forms are not maintained, so that a density of the catalytic fine particles is decreased (FIG. 7A). Since a diameter of the CNT is specified by a size of the catalytic particle, CNTs 104 are formed uneven in forming location and diameter (FIG. 7B), and so there is a problem that a dense growth of the CNTs is difficult.

For example, in Patent Document 1, there is disclosed a technology in which a catalytic metal layer is formed on an aluminum layer being a base thin film and then fine particles including the catalytic metals are formed by a heat treatment. In this method, it is difficult to control forms of the fine particles as desired, and therefore a decreased density of the catalytic particles is brought about similarly to in the above-described case.

SUMMARY OF THE INVENTION

According to an aspect of an embodiment, there is a substrate structure including: a substrate; a base material formed in a predetermined region above the substrate; a catalytic material formed in the predetermined region; a linear structure made of carbon elements formed on the catalytic material, wherein the base material is a deposit of a fine particle form contacting a surface of the predetermined region and the catalytic material is a deposit of a fine particle form contacting at least the base material and having a particle diameter equal to or smaller than a particle diameter of the base material.

According to another aspect of an embodiment, there is a manufacturing method of a substrate structure including the steps of: forming a base material in a predetermined region above a substrate; forming a catalytic material in the predetermined region; and growing a linear structure made of carbon elements with the catalytic material being nucleuses, wherein the base material is formed into a fine particle form contacting a surface of the predetermined region and the catalytic material is formed into a fine particle form contacting at least the base material and having a particle diameter equal to or smaller than a particle diameter of the base material.

DETAILED DESCRIPTION OF THE PREFERRED EMBODIMENTS

—Basic Gist of Present Invention—

Figure 1A:
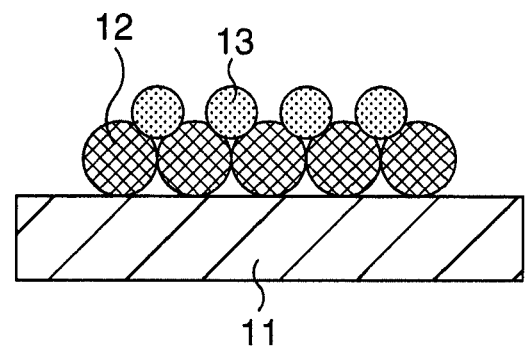
FIG. 1A to FIG. 1C are schematic cross-sectional views showing, step by step, a manufacturing method of a substrate structure according to a first embodiment.

In the present invention, a base material is formed as a deposit of a fine particle form contacting a surface of a predetermined region. At the same time, a catalytic material is formed as a deposit of a fine particle form contacting at least the base material and having a particle diameter equal to or smaller than a particle diameter of the base material.

When the catalytic material is formed into the fine particle form from the beginning, since the catalytic fine particle has a particle diameter equal to or smaller than a particle diameter of a base fine particle, the catalytic fine particles fit gaps (recesses) generated between the neighboring base fine particles. Therefore, even when inside of a CVD chamber is heated to a growth temperature of a linear structure made of carbon elements, for example, CNTs, after the base material and the catalytic material are deposited on a substrate, the catalytic fine particles are not aggregated and are supported in the above-described gaps being contact portions with the base fine particles, though shapes of the both fine particles change depending on temperature increase. Thus, uniformity of the particle diameters is maintained. Therefore, it is possible to grow the CNTs in high density in a state without unevenness, with the diameters being controlled to be uniform by the catalytic fine particles.

On the other hand, when the catalytic material is formed into a thin film form at the beginning, the catalytic material becomes fine particles by heating to the growth temperature of the CNT. On this occasion, the catalytic material gathers in the above-described gaps being the contact portions with the base fine particles in sizes suitable for the gaps and are supported in the gaps, so that catalytic fine particles with uniform particle diameters are formed. Therefore, it is possible to grow the CNTs in high density in a state without unevenness, with the diameters being controlled to be uniform by the catalytic particles.

Here, as for positional relationships between the base fine particles and the catalytic fine particles, the following first to third positional relationships are considered.

The first positional relationship is a state that the catalytic fine particle is in contact with the base fine particle and alienated from a substrate surface, that is, a positional relationship in which the catalytic fine particle exists on the base fine particle.

The second positional relationship is a state that the catalytic fine particle contacting the base fine particle and alienated from the substrate surface and the catalytic fine particle contacting both the base fine particle and the substrate surface mixedly exist, that is, a positional relationship in which the base fine particle and the catalytic fine particle mixedly exist.

The third positional relationship is a state that the catalytic fine particle contacts both the base fine particle and the substrate surface, that is, a positional relationship in which both the base fine particle and the catalytic fine particle exist on the substrate surface.

The CNTs can be obtained in high density in a state without unevenness with the diameters being controlled to be uniform in any of the first to third positional relationships. However, in the second positional relationship and particularly in the third positional relationship, since mutual diffusion of the base fine particle and the catalytic fine particle is accelerated and CNT contacts the base fine particle in part of a side surface of the CNT, an area of electrical contact of the CNT with the base fine particle increases, so that further low resistance is realized.

Here, as the base material, at least one kind selected from Ti, TiN, Al and Ta, or a metal oxide is suitable. As the catalytic material, at least one kind selected from Fe, Ni and Co is preferable.

In Patent Document 2, there is disclosed a technology in which a magnetic field is applied on metal fine particles with different susceptibilities to separate metal fine particles so that a multilayer state of an intervening metal fine particle layer and a catalytic metal fine particle layer is formed. However, in this case, since the magnetic field is applied to separate the fine particles, it is difficult to separate metal fine particles with similar susceptibilities, and the technology is inadaptable to unmagnetized metal fine particles. Therefore, there is a problem that a range of applicable metal materials is quite narrow. Further, in Patent Document 2, a relationship between sizes of the intervening metal fine particle and the catalytic metal fine particle is not referred to at all. This invention is objected to prevent unnecessary radiation such as light emission variation, and in consideration of adopting a constitution of separating the metal fine particles for that object, it can be said that the smaller the intervening metal fine particle of the lower layer, the more preferable it is.

In contrast, in the present invention, in order to prevent the aggregation of the catalytic fine particles, the relationship of the sizes of the base fine particle and the catalytic fine particle is one of the most significant matters. Therefore, making the size of the catalytic particle equal to or smaller than the size of the base fine particle is an essential condition.

—Concrete Embodiments to which Present Invention is Applied—

Hereinafter, concrete embodiments to which the present invention is applied will be described in detail with reference to the drawings. In the present embodiments, constitutions of substrate structures will be described in detail along with manufacturing methods thereof for the sake of convenience of description. It should be noted that the same numerals and symbols are given to components and the like common to each embodiment.

(First Embodiment)

Figure 1B:
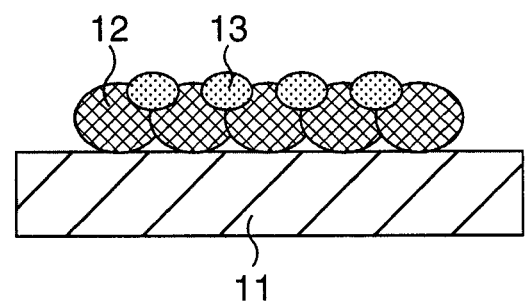
Figure 1C:
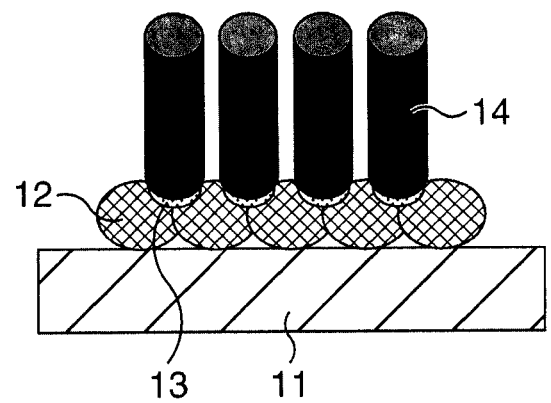

FIG. 1A to FIG. 1C are schematic cross-sectional views showing, step by step, a manufacturing method of a substrate structure according to a first embodiment.

As shown in FIG. 1A, TiN fine particles 12 and Co fine particles 13 are sequentially deposited on a silicon substrate 11.

More specifically, first, with TiN being a base material, the TiN fine particles 12 are deposited on the silicone substrate 11 by, for example, a laser ablation method so that diameters thereof are about 3 nm. Here, in order that, in a positional relationship between the TiN fine particles 12 and the later-described Co fine particles 13, the Co fine particles 13 exist on the TiN fine particles 12, the TiN fine particles 12 are deposited for a deposit time of about 1000 seconds to 1100 seconds so that a density of the TiN fine particles 12 on a surface of the silicon substrate 11 becomes 95% to 105%.

Next, with Co being a catalytic material, the Co fine particles 13 are deposited on the silicon substrate 11 on which the TiN fine particles 12 are deposited, by, for example, the laser ablation method so that sizes thereof are equal to or smaller than the sizes of the TiN fine particles 12, here, about 1 nm in diameter.

At this time, the Co fine particles 13 contact the TiN fine particles 12 and are alienated from the surface of the silicone substrate 11. Since the Co fine particle 13 is smaller than the TiN fine particle 12, the Co fine particles 13 fit gaps (recesses) generated between the neighboring TiN fine particles 12.

Here, as the base material, Ti, Al, Ta or the like can be used instead of TiN or in addition to TiN. As the catalytic material, Fe, Ni or the like can be used instead of Co or in addition to Co.

As a forming method of the TiN fine particles 12 and the Co fine particles 13, for example, a sputtering method can be used instead of the laser ablation method. In the sputtering method, a pressure being one of deposition conditions is usually set to be about 0.4 Pa to 1 Pa when forming a TiN film, a Co film or the like. It is possible to make fine particles under that condition if a film thickness is equal to or smaller than 5 nm. Further, even if the pressure is set to be higher than above, for example, to be about 10 Pa to 40 Pa, it is also possible to form TiN fine particles, Co fine particles or the like.

Subsequently, in order for CNT growth being a next step, the silicon substrate 11 is set in a CVD chamber and heated to equal to or higher than 350° C. On this occasion, as shown in FIG. 1B, shapes of the TiN fine particles 12 and the Co fine particles 13 change depending on temperature increase. However, the Co fine particles 13 are not aggregated and are supported in the above-described gaps being contact portions with the TiN fine particles 12, so that uniformity of particle diameters is maintained.

Subsequently, as shown in FIG. 1C, CNTs 14 are grown with the Co fine particles 13 being nucleuses.

More specifically, a mixed gas of acetylene and argon is introduced in a ratio of, for example, 0.05:1000 into the CVD chamber in which the silicon substrate 11 is set, and the CNTs 14 are grown for 90 minutes under an entire pressure of 1 kPa at a temperature of 390° C. Thereby, it is possible to grow the CNTs 14 in high density and in a state without unevenness with the diameters being controlled to be uniform by the Co fine particles 13. Further, the TiN fine particles 12 mutually disperse, so that electrical interengagement of the CNTs 14 is improved.

As described above, according to the present embodiment, a substrate structure is realized which has a simple constitution and in which a catalytic material is easily and surely formed into a state of uniform and highly dense fine particles so that CNTs 14 are grown in high density without unevenness with diameters being controlled to be uniform by Co fine particles 13.

(Second Embodiment)

Figure 2A:
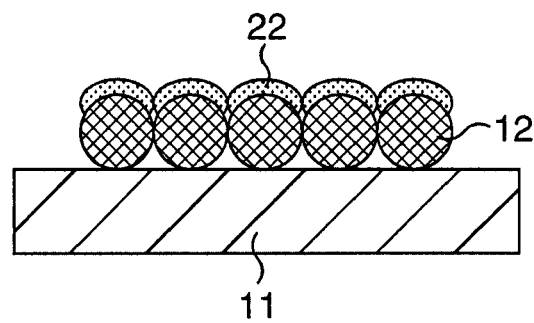
FIG. 2A to FIG. 2C are schematic cross-sectional views showing, step by step, a manufacturing method of a substrate structure according to a second embodiment.
Figure 2B:
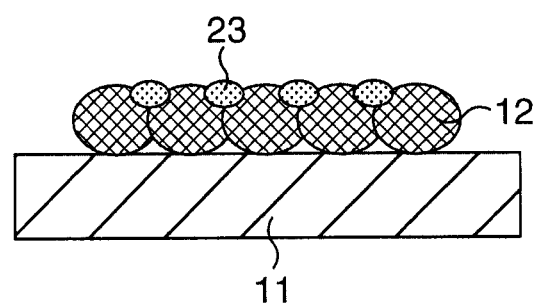
Figure 2C:
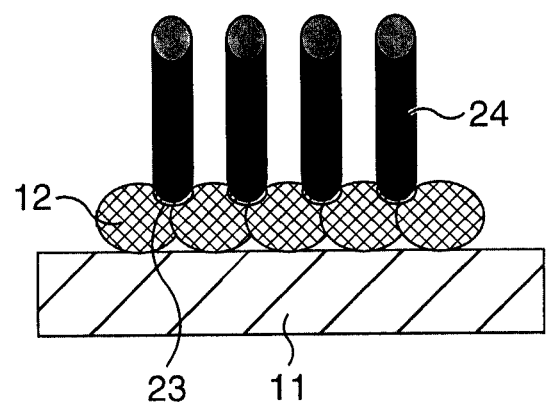

FIG. 2A to FIG. 2C are schematic cross-sectional views showing, step by step, a manufacturing method of a substrate structure according to a second embodiment.

As shown in FIG. 2A, TiN fine particles 21 and Co thin films 22 are sequentially deposited on a silicon substrate 11.

More specifically, first, with TiN being a base material, the TiN fine particles 21 are deposited on the silicone substrate 11 by, for example, a laser ablation method so that diameters thereof are about 3 nm. Here, the TiN fine particles 21 are deposited for a deposit time of about 1000 seconds to 1100 seconds so that a density of the TiN fine particles 21 on a surface of the silicon substrate 11 becomes about 95% to 105%.

Next, with Co being a catalytic material, the Co thin films 22 are deposited on the silicon substrate 11 on which the TiN fine particles 21 are deposited, by, for example, a sputtering method so that film thicknesses of the Co thin films 22 are about 1 nm. As for a film forming condition, an Ar gas pressure is 0.4 Pa, an inputted electric power is 0.5 kW, and a film forming time is about 3 seconds.

Here, as the base material, Ti, Al, Ta or the like can be used instead of TiN or in addition to TiN. As the catalytic material, Fe, Ni or the like can be used instead of Co or in addition to Co.

Subsequently, in order for CNT growth being a next step, the silicon substrate 11 is set in a CVD chamber and heated to equal to or higher than 350° C. At this time, as shown in FIG. 2B, the Co thin films 22 become fine particles due to temperature increase. On this occasion, the Co thin films 22 gather into gaps (recesses) generated between the neighboring TiN fine particles 21, the gaps being contact portions with the TiN fine particles 21, to be sizes suitable for the gaps and become in a state of being supported in the gaps, so that Co fine particles 23 with uniform particle diameters are formed.

Subsequently, as shown in FIG. 2C, CNTs 24 are grown with the Co fine particles 23 being nucleuses.

More specifically, a mixed gas of acetylene, argon and hydrogen is introduced in a ratio of, for example, 0.5:950:50 into the CVD chamber in which the silicon substrate 11 is set, and the CNTs 24 are grown for 90 minutes under an entire pressure of 1 kPa at a temperature of 400° C. Thereby, it is possible to grow the CNTs 24 in high density and in a state without unevenness with the diameters being controlled to be uniform by the Co fine particles 23. Further, the TiN fine particles 21 mutually disperse, so that electrical interengagement of the CNTs 24 is improved.

As described above, according to the present embodiment, a substrate structure is realized which has a simple constitution and in which a catalytic material is easily and surely formed into a state of uniform and highly dense fine particles so that CNTs 24 are grown in high density without unevenness with diameters being controlled to be uniform by Co fine particles 23.

(Third Embodiment)

FIG. 3A to FIG. 3D are schematic cross-sectional views showing, step by step, a manufacturing method of a substrate structure according to a third embodiment.

Figure 3A:
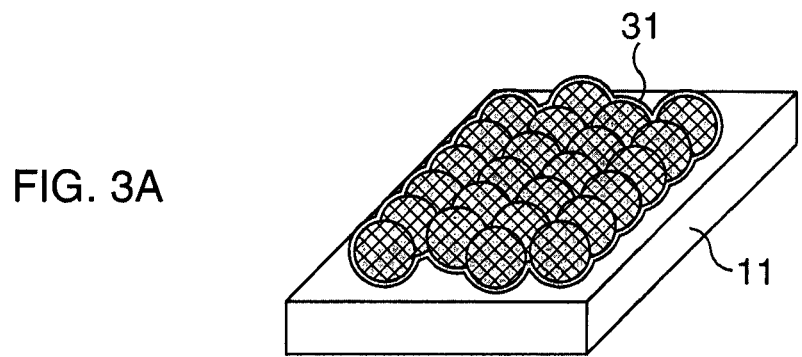
FIG. 3A to FIG. 3D are schematic cross-sectional views showing, step by step, a manufacturing method of a substrate structure according to a third embodiment.

As shown in FIG. 3A, ferritin 31 is deposited on a silicon substrate 11.

In the present embodiment, iron oxide contained in the ferritin being an iron-containing protein is assumed as a base material. The ferritin is made in a state to be dispersed in water and an organic solvent. The silicon substrate 11 is immersed in the organic solvent in which the ferritin is dispersed and the silicon substrate 11 is taken out by a pulling up method. At this time, the ferritin 31 is arranged in a closely packed manner on the silicon substrate 11.

Figure 3B:
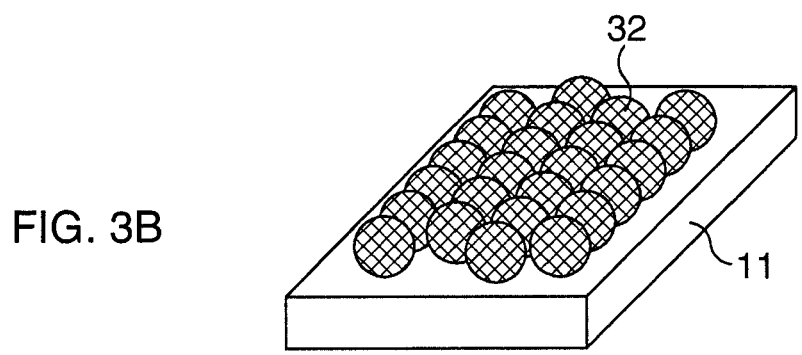

Subsequently, as shown in FIG. 3B, iron oxide fine particles 32 are generated from the ferritin 31.

More specifically, the silicon substrate 11 is heat-treated in oxygen or in atmosphere. Thereby, a protein component covering a surface of the ferritin 31 is removed, so that the substrate 11 becomes in a state that the iron oxide particles 32 are closely packed. A diameter of the iron oxide particle 32 is, for example, about 6 nm.

Figure 3C:
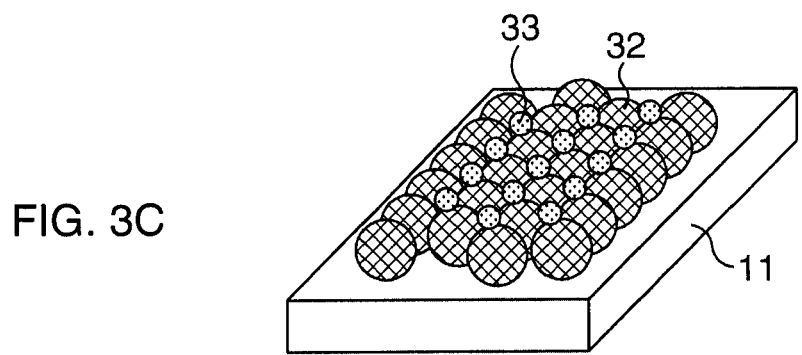

Subsequently, as shown in FIG. 3C, Co fine particles 33 are deposited.

More specifically, with Co being a catalytic material, the Co fine particles 33 are deposited on the silicon substrate 11 on which the iron oxide particles 32 are deposited, by, for example a laser ablation method so that sizes of the Co fine particles 33 are equal to or smaller than sizes of the iron oxide fine particles 32, here, about 3 nm in diameter. Here, as the catalytic material, Fe, Ni or the like can be used instead of Co or in addition to Co.

At this time, since the Co fine particle 33 is smaller than the iron oxide fine particle 32, the Co fine particles 33 fit gaps (recesses) generated between the neighboring iron oxide fine particles 32.

Subsequently, in order for CNT growth being a next step, the silicon substrate 11 is set in a CVD chamber and heated to equal to or higher than 350° C. On this occasion, shapes of the iron oxide fine particles 32 and the Co fine particles 33 change depending on temperature increase. However, the Co fine particles 33 are not aggregated and are supported in the above-described gaps being contact portions with the iron oxide fine particles 32, so that uniformity of particle diameters is maintained.

Figure 3D:
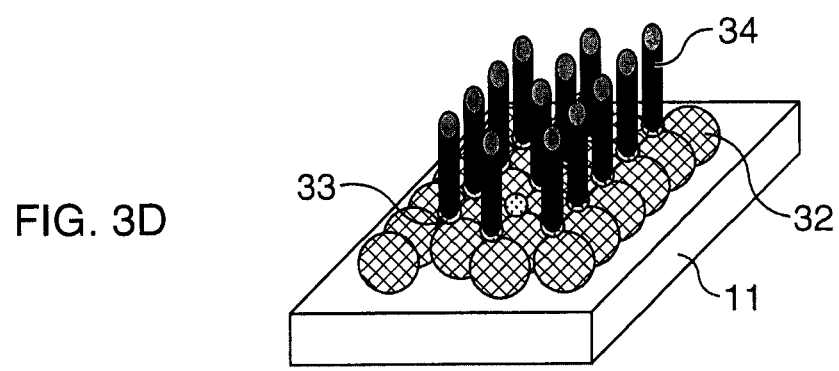

Subsequently, as shown in FIG. 3D, CNTs 34 are grown with the Co fine particles 33 being nucleuses.

More specifically, a mixed gas of acetylene, argon and hydrogen is introduced in a ratio of, for example, 0.5:900:100 into the CVD chamber in which the silicon substrate 11 is set, and the CNTs 34 are grown for 90 minutes under an entire pressure of 1 kPa at a temperature of 400° C. Thereby, it is possible to grow the CNTs 34 in high density and in a state without unevenness with the diameters being controlled to be uniform by the Co fine particles 33.

In the present embodiment, since the iron oxygen fine particles 32 being the base material are formed closely packed, numerous projections and recesses are formed on a surface and intervals thereof are uniform, forming an orderly structure. Therefore, at the time that a growth temperature of the CNT 34 is reached, the Co fine particles 33 are arranged evenly without aggregation between the Co fine particles 33. Diameters of the CNTs 34 are controlled by the diameters of the Co fine particles 33, and it is possible to grow the CNTs 34 in high density without unevenness with the diameters being controlled to be uniform.

As described above, according to the present embodiment, a substrate structure is realized which has a simple constitution and in which a catalytic material is easily and surely formed into a state of uniform and highly dense fine particles so that CNTs 34 are grown in high density without unevenness with diameters being controlled to be uniform by Co fine particles 33.

(Fourth Embodiment)

Here, a fourth embodiment will be described.

FIG. 4A to FIG. 4D are schematic cross-sectional views showing, step by step, a manufacturing method of a substrate structure according to the fourth embodiment.

Figure 4A:
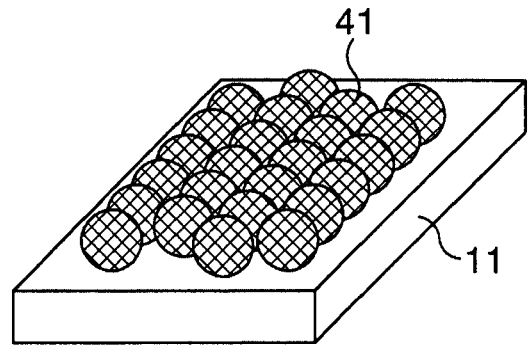
FIG. 4A to FIG. 4D are schematic cross-sectional views showing, step by step, a manufacturing method of a substrate structure according to a fourth embodiment.

As shown in FIG. 4A, Co fine particles 41 are deposited on a silicon substrate 11.

In the present embodiment, Co fine particles surrounded by surfactant are assumed as a base material. Here, Co fine particles aqueous solution is assumed in which Co fine particles of, for example, 4 nm in diameter are dispersed by an inverse micelle method. The diameter of the Co fine particle can be adjusted in a rage of about 1 nm to 5 nm. The silicon substrate 11 is immersed in the Co fine particles aqueous solution and the silicon substrate 11 is taken out by a pulling up method. At this time, the Co fine particles 41 are arranged in a closely packed manner on the silicon substrate 11.

Figure 4B:
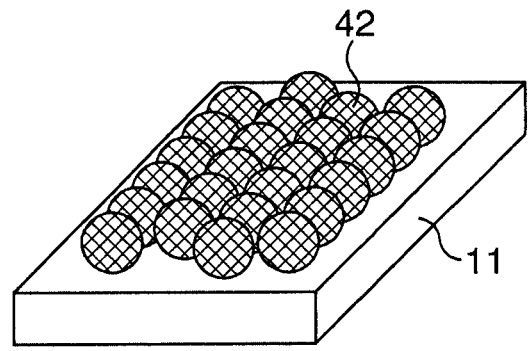

Subsequently, as shown in FIG. 4B, fine particles 42 of cobalt oxide are generated.

More specifically, the silicon substrate 11 is heat-treated in oxygen or in atmosphere. Thereby, a hydrophilic group covering a surface of the Co fine particle 41 is removed, so that the fine particles 42 of cobalt oxide in a closed-pack state are generated. It should be noted that all the Co fine particles 41 are not necessarily completely (not all of them are) oxidized by heat treatment, and at least part thereof may sometimes remain in a state to be regarded as the Co fine particles 41. However, here, description is performed on the assumption that fine particles are of cobalt oxide, for the sake of convenience.

Figure 4C:
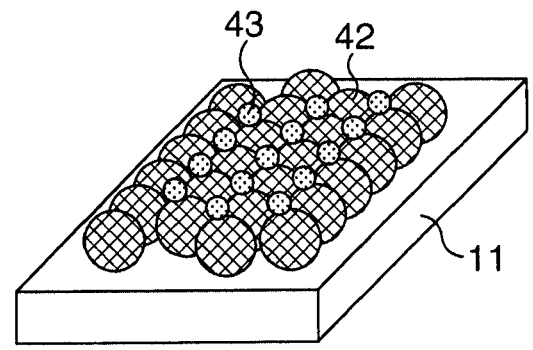

Subsequently, as shown in FIG. 4C, the Co fine particles 43 are deposited.

More specifically, with Co being a catalytic material, the Co fine particles 43 are deposited on the silicon substrate 11 on which the fine particles 42 of cobalt oxide are deposited, by, for example, a laser ablation method so that sizes of the Co fine particles 43 are equal to or smaller than sizes of the fine particles 42 of cobalt oxide, here, about 2 nm in diameter. Here, as the catalytic material, Fe, Ni or the like can be used instead of Co or in addition to Co.

At this time, since the Co fine particle 43 is smaller than the fine particle 42 of cobalt oxide, the Co fine particles 43 fit gaps (recesses) generated between the neighboring fine particles 42 of cobalt oxide.

Subsequently, in order for CNT growth being a next step, the silicon substrate 11 is set in a CVD chamber and heated to equal to or higher than 350° C. On this occasion, shapes of the fine particles 42 of cobalt oxide and the Co fine particles 43 change depending on temperature increase. However, the Co fine particles 43 are not aggregated and are supported in the above-described gaps being contact portions with the fine particles 42 of cobalt oxide, so that uniformity of particle diameters is maintained.

Figure 4D:
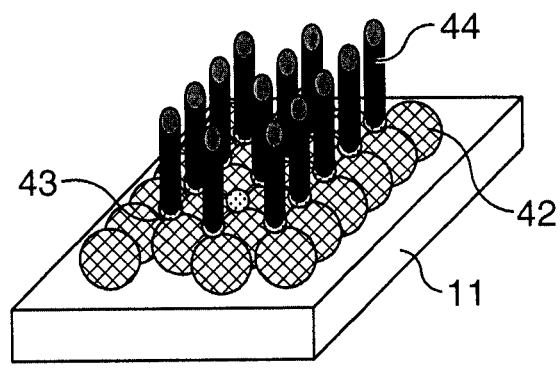

Subsequently, as shown in FIG. 4D, CNTs 44 are grown with the Co fine particles 43 being nucleuses.

More specifically, a mixed gas of acetylene, argon and hydrogen is introduced in a ratio of, for example, 0.5:800:200 into the CVD chamber in which the silicon substrate 11 is set, and the CNTs 44 are grown for 90 minutes under an entire pressure of 1 kPa at a temperature of 400° C. Thereby, it is possible to grow the CNTs 44 in high density and in a state without unevenness with the diameters being controlled to be uniform by the Co fine particles 43.

In the present embodiment, since the fine particles 42 of cobalt oxide being the base material are formed closely packed, numerous projections and recesses are formed on a surface and intervals thereof are uniform, forming an orderly structure. Therefore, at the time that a growth temperature of the CNT 44 is reached, the Co fine particles 43 are arranged evenly without aggregation between the Co fine particles 43. Diameters of the CNTs 44 are controlled by the diameters of the Co fine particles 43, and it is possible to grow the CNTs 44 in high density without unevenness with the diameters being controlled to be uniform.

As described above, according to the present embodiment, a substrate structure is realized which has a simple constitution and in which a catalytic material is easily and surely formed into a state of uniform and highly dense fine particles so that CNTs 44 are grown in high density without unevenness with diameters being controlled to be uniform by Co fine particles 43.

(Fifth Embodiment)

Figure 5A:
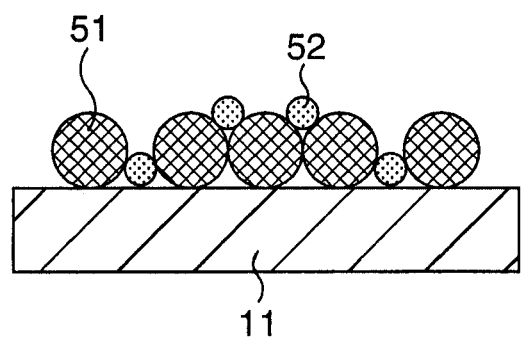
FIG. 5A and FIG. 5B are schematic cross-sectional views showing, step by step, a manufacturing method of a substrate structure according to a fifth embodiment.
Figure 5B:
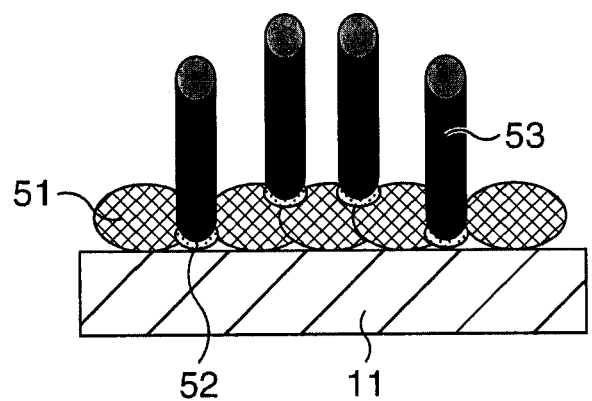

FIG. 5A and FIG. 5B are schematic cross-sectional views showing, step by step, a manufacturing method of a substrate structure according to a fifth embodiment.

As shown in FIG. 5A, TiN fine particles 51 and Co fine particles 52 are sequentially deposited on a silicon substrate 11.

More specifically, first, with TiN being a base material, the TiN fine particles 51 are deposited on the silicon substrate 11 by, for example, a laser ablation method so that diameters of the TiN fine particles 51 are about 5 nm. Here, in order that, in a positional relationship between the TiN fine particles 51 and the later-described Co fine particles 52, the both mixedly exist, the TiN fine particles 51 are deposited for a deposit time of about 500 seconds to 800 seconds so that a density of the TiN fine particles 51 on a surface of the silicon substrate 11 becomes about 50% to 80%.

Next, with Co being a catalytic material, the Co fine particles 52 are deposited on the silicon substrate 11 on which the TiN fine particles 51 are deposited, by, for example, the laser ablation method so that sizes of the Co fine particles 52 are equal to or smaller than sizes of the TiN fine particles 51, here, about 2 nm in diameter.

At this time, there mixedly exist Co fine particles 52 contacting TiN fine particle 51 and alienated from a surface of the silicon substrate 11 and Co fine particles 52 contacting both the TiN fine particle 51 and the surface of the silicon substrate 11.

Here, as the base material, Ti, Al, Ta or the like can be used instead of TiN or in addition to TiN. As the catalytic material, Fe, Ni or the like can be used instead of Co or in addition to Co.

Subsequently, in order for CNT growth being a next step, the silicon substrate 11 is set in a CVD chamber and heated to equal to or higher than 350° C. On this occasion, shapes of the TiN fine particles 51 and the Co fine particles 52 change depending on temperature increase. However, the Co fine particles 52 are not aggregated and are supported by contact portions with the TiN fine particles 51, so that uniformity of particle diameters is maintained.

Subsequently, as shown in FIG. 5B, CNTs 53 are grown with the Co fine particles 52 being nucleuses.

More specifically, a mixed gas of acetylene and argon is introduced in a ratio of, for example, 0.05:1000 into the CVD chamber in which the silicon substrate 11 is set, and the CNTs 53 are grown for 90 minutes under an entire pressure of 1 kPa at a temperature of 400° C. Thereby, it is possible to grow the CNTs 53 in high density and in a state without unevenness with the diameters being controlled to be uniform by the Co fine particles 52. Further, since mutual diffusion of the TiN fine particles 51 and the Co fine particles 52 is accelerated and some of the CNTs 53 contacts the TiN fine particles 51 in part of a side surface of the CNT 53, an area of electrical contact of the CNT 53 with the TiN fine particle 51 increases, so that further low resistance is realized.

As described above, according to the present embodiment, a substrate structure is realized which has a simple constitution and in which a catalytic material is easily and surely formed into a state of uniform and highly dense fine particles so that CNTs 53 are grown in high density without unevenness with diameters being controlled to be uniform by Co fine particles 52.

(Sixth Embodiment)

Figure 6A:
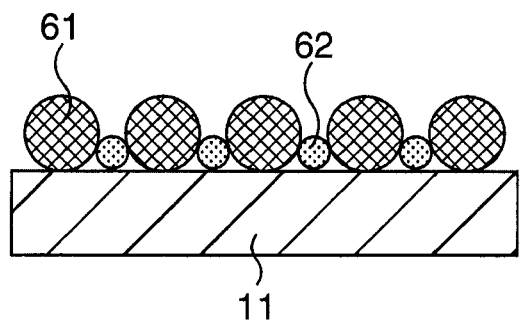
FIG. 6A and FIG. 6B are schematic cross-sectional views showing, step by step, a manufacturing method of a substrate structure according to a sixth embodiment.
Figure 6B:
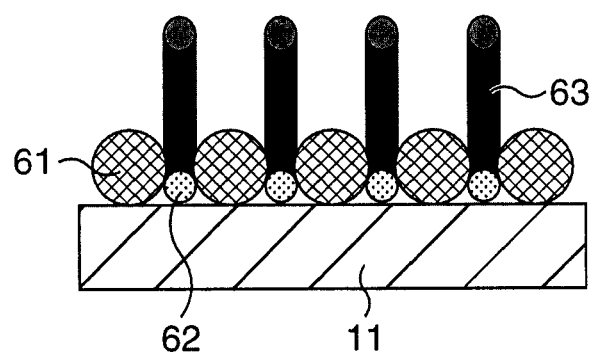
Figure 7A:
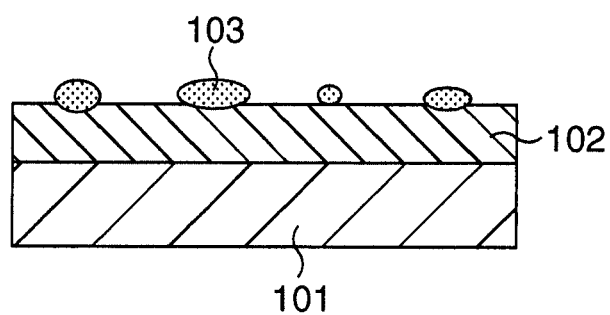
FIG. 7A and FIG. 7B are cross-sectional views to explain a problem of a conventional growing method of a CNT.
Figure 7B:
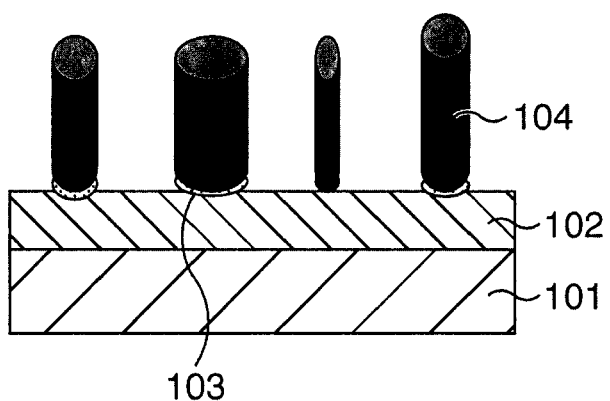

FIG. 6A and FIG. 6B are schematic cross-sectional views showing, step by step, a manufacturing method of a substrate structure according to a sixth embodiment.

As shown in FIG. 6A, TiN fine particles 61 and Co fine particles 62 are sequentially deposited on a silicon substrate 11.

More specifically, first, with TiN being a base material, the TiN fine particles 61 are deposited on the silicon substrate 11 by, for example, a laser ablation method so that diameters of the TiN fine particles 61 are about 5 nm. Here, in order that, in a positional relationship between the TiN fine particles 61 and the later-described Co fine particles 62, both the TiN fine particles 61 and the Co fine particles 62 exist on a surface of the silicon substrate 11, the TiN fine particles 61 are deposited for a deposit time of about 300 seconds to 500 seconds so that a density of the TiN fine particles 61 on the surface of the silicon substrate 11 becomes about 30% to 50%.

Next, with Co being a catalytic material, the Co fine particles 62 are deposited on the silicon substrate 11 on which the TiN fine particles 61 are deposited, by, for example, the laser ablation method so that sizes of the Co fine particles 62 are equal to or smaller than sizes of the TiN fine particles 61, here, about 2 nm in diameter.

At this time, the Co fine particle 62 is in contact with both the Tin particle 61 and the surface of the silicon substrate 11.

Here, as the base material, Ti, Al, Ta or the like can be used instead of TiN or in addition to TiN. As the catalytic material, Fe, Ni or the like can be used instead of Co or in addition to Co.

Subsequently, in order for CNT growth being a next step, the silicon substrate 11 is set in a CVD chamber and heated to equal to or higher than 350° C. On this occasion, shapes of the TiN fine particles 61 and the Co fine particles 62 change depending on temperature increase. However, the Co fine particles 62 are not aggregated and are supported with being in contact with the silicon substrate 11 and the TiN fine particles 61, so that uniformity of particle diameters is maintained.

Subsequently, as shown in FIG. 6B, CNTs 63 are grown with the Co fine particles 62 being nucleuses.

More specifically, a mixed gas of acetylene and argon is introduced in a ratio of, for example, 0.05:1000 into the CVD chamber in which the silicon substrate 11 is set, and the CNTs 63 are grown for 90 minutes under an entire pressure of 1 kPa at a temperature of 400° C. Thereby, it is possible to grow the CNTs 63 in high density and in a state without unevenness with the diameters being controlled to be uniform by the Co fine particles 62. Further, since mutual diffusion of the TiN fine particles 61 and the Co fine particles 62 is accelerated and the CNT 63 contacts the TiN fine particle 51 in part of a side surface of the CNT 63, an area of electrical contact of the CNT 63 with the TiN fine particle 61 increases, so that further low resistance is realized.

As described above, according to the present embodiment, a substrate structure is realized which has a simple constitution and in which a catalytic material is easily and surely formed into a state of uniform and highly dense fine particles so that CNTs 63 are grown in high density without unevenness with diameters being controlled to be uniform by Co fine particles 62.

In the above-described embodiments, cases that the CNTs are formed as a linear structure of carbon elements are shown as examples, but a CNF of a fiber type, for example, can be used instead of the CNT. In this case, similarly to in formation of the CNTs, a CVD method, a thermal CVD method or the like is used and the CNFs are grown and formed at a temperature (for example, about 300° C.) lower than the temperature at a CNT formation time.

According to the present invention, a substrate structure is realized which has a simple constitution in which a catalytic material is easily and surely formed into a state of uniform and highly dense particles and which enables growth of a linear structure made of highly dense carbon elements without unevenness, with diameters of the carbon elements being controlled to be uniform.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A manufacturing method of a substrate structure, comprising the steps of:
    forming a base material into first particles contacting a surface of a substrate so that the neighboring first particles are in contact with each other, over the substrate;
    depositing a catalytic material as second particles being in a state of particles having a particle diameter equal to or smaller than a particle diameter of the first particles, to fit gaps generated between each pair of the neighboring first particles, on the base material;
    growing a linear structure made of carbon elements with the second particles being nucleases;
    wherein the catalytic material is in a particle form contacting both the base material and the surface of the substrate.

2. The manufacturing method of the substrate structure according to claim 1, wherein the base material is one kind selected from Ti, TiN, and Al, or is made of a metal oxide.

3. The manufacturing method of the substrate structure according to claim 1, wherein the catalytic material is at least one kind selected from Fe, Ni and Co.

4. The manufacturing method of the substrate structure according to claim 1, wherein the catalytic material has a melting point higher than a melting point of the base material.

5. The manufacturing method of the substrate structure according to claim 1, wherein the first particles are iron oxide particles contained in an iron-containing protein.

6. The manufacturing method of the substrate structure according to claim 1, wherein the first particles are particles of cobalt oxide generated with using Co particles surrounded by surfactant.

7. A manufacturing method of a substrate structure, comprising the steps of:
forming a base material into first particles contacting a surface of a substrate so that at least part of the neighboring first particles are in contact with each other and the rest of the neighboring first particles are not in contact with each other, over the substrate;
forming a catalytic material into second particles having a particle diameter equal to or smaller than a particle diameter of the first particles, to fit gaps generated between each pair of the neighboring first particles; and
growing a linear structure made of carbon elements with the second particles being nucleuses,
wherein the catalytic material is made into a state that there mixedly exist a particle contacting the base material and alienated from the surface of the substrate and a particle contacting both the base material and the surface of the substrate.

8. A manufacturing method of a substrate structure, comprising the steps of:
forming a base material into first particles contacting a surface of a substrate so that at least part of the neighboring first particles are in contact with each other and the rest of the neighboring first particles are not in contact with each other, over the substrate;
forming a catalytic material into second particles having a particle diameter equal to or smaller than a particle diameter of the first particles, to fit gaps generated between each pair of the neighboring first particles; and
growing a linear structure made of carbon elements with the second particles being nucleuses,
wherein the catalytic material is formed into a particle form contacting both the base material and the surface of the substrate.

* * * * *